United States Patent
Advani et al.

(12)

(10) Patent No.: US 8,311,924 B2
(45) Date of Patent: Nov. 13, 2012

(54) SYSTEM AND METHOD FOR PROVIDING INCOME PAYMENTS TO AN INVESTOR

(75) Inventors: Nikhil A. Advani, Cary, NC (US);
George E. Silos, Bogota, NJ (US);
Cheryl Ann Reese, New York, NY (US)

(73) Assignee: New York Life Insurance Company, New York, NY (US)

( * ) Notice: Subject to any disclaimer, the term of this patent is extended or adjusted under 35 U.S.C. 154(b) by 41 days.

(21) Appl. No.: 13/045,305

(22) Filed: Mar. 10, 2011

(65) Prior Publication Data
US 2012/0233088 A1 Sep. 13, 2012

(51) Int. Cl.
*G06Q 40/00* (2012.01)
(52) U.S. Cl. .................................... 705/36 R
(58) Field of Classification Search ................. 705/36 R
See application file for complete search history.

(56) References Cited

OTHER PUBLICATIONS

Cont et al.: Constant Proportion Portfolio Insurance in presence of Jumps in Asset Prices, Feb. 7, 2007, Columbia University Center for Financial Engineering, pp. 1-19.*
Cocco et al.: Consumption and Portfolio Choice over the Life Cycle, 2005, The Review of Financial Studies vol. 18, No. 2, pp. 1-43.*
Investment Company Institute (ICI): Frequently Asked Questions about Target Date or Lifecycle Funds, Jun. 2009, pp. 1-7.*

* cited by examiner

*Primary Examiner* — Bijendra K Shrestha
(74) *Attorney, Agent, or Firm* — Seth H. Ostrow; Ostrow Kaufman LLP

(57) ABSTRACT

In at least one embodiment computerized methods and corresponding systems for providing guaranteed income payments to an investor are provided that include the step or steps of: receiving information from the investor representing at least a current age of the investor, a desired income start date, a desired income payment amount, and a premium payment amount; receiving a premium payment from the investor and placing the premium payment into a first investment sleeve; and automatically transferring using at least one computing device, during a waiting period and according to a predefined event, a portion of the premium payment from the first investment sleeve to a second investment sleeve, wherein the portion of the premium payment transferred calculated by the at least one computing device as a function of a time remaining in the waiting period and the desired income amount.

18 Claims, 7 Drawing Sheets

FIG. 2

| Age at Purchase | Deferral Period | | | |
| --- | --- | --- | --- | --- |
| | 5 Years | 10 Years | 15 Years | 20 Years |
| 55-60 | 4%-7% | 5%-9% | 6%-10% | 7%-13% |
| 61-65 | 5%-9% | 6%-10% | 7%-13% | 9%-16% |
| 66-70 | 6%-10% | 7%-13% | 9%-16% | 10%-18% |
| 71-75 | 7%-13% | 9%-16% | 10%-18% | 11%-20% |

201

| Year | Investment Sleeve | DIA Sleeve | Total Value | Market | Interest Rates |
|---|---|---|---|---|---|
| Initial Premium | $95,000 | $5,000 | $100,000 | | |
| 2 | $84,000 | $10,000 | $94,000 | ↑ | ↑ |
| 3 | $90,000 | $15,000 | $105,000 | ↓ | ↕ |
| 4 | $77,000 | $22,000 | $99,000 | ↓ | ↑ |
| 5 | $65,000 | $29,000 | $94,000 | ↑ | ↓ |
| 6 | $70,000 | $34,000 | $104,000 | ↓ | ↑ |
| 7 | $68,000 | $40,000 | $108,000 | ↓ | ↕ |
| 8 | $59,000 | $44,000 | $104,000 | ↓ | ↑ |
| 9 | $50,000 | $47,000 | $97,000 | ↑ | ↑ |
| 10 | $50,000 | $49,000 | $99,000 | ↑ | ↑ |
| 11 | $56,000 | Lifetime Income $7,000 begins at age 65 | | | |

FIG. 3

SYSTEM AND METHOD FOR PROVIDING INCOME PAYMENTS TO AN INVESTOR

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This application relates to the field of computerized methods and systems for financial planning. More specifically, the present application is directed toward computerized methods and systems for investing premium payments received from an investor and providing income payments to the investor beginning at a predefined time.

BACKGROUND OF THE INVENTION

Individual savings, including retirement savings, has been greatly impacted by the growth of the stock market and retirement plans that offer individual unmanaged accounts. Both of these recent phenomena generally require the investor to determine how much to save and how to invest those savings, including allocating the savings in the investor's individual savings or similar account between various types of asset classes. Investors, including retirees, have many software options available to assist them with investment planning. For example, some software used in retirement planning allows the user to enter the appropriate information (e.g., a user's age, current income, assets, retirement goal, etc.) and the program may output a general list of things the user can do to reach the desired goal, e.g., save more now, change investments, retire later, work part-time, etc. Some software programs also recommend allocations of savings between various investment products based on the investor's individual goals.

An investor can select many different investment products for a retirement portfolio. One investment vehicle is common stock, which has the potential to produce high returns. Unfortunately, the value of stock and equities in general can be volatile, and losses due to this volatility may severely impact retirement savings. Investments in cash equivalents, such as in money market accounts or certificates of deposit, are far less volatile, but yields may be unacceptably low. An asset allocation made up of stocks, bonds, real estate, cash equivalents and other asset classes may therefore be desirable for some investors to minimize volatility while maintaining acceptable returns.

Another type of asset that can be purchased for retirement is an annuity. Annuities are available in many forms, e.g., deferred variable annuities, fixed deferred annuities, deferred income annuities, variable immediate annuities and fixed immediate annuities. A fixed immediate annuity is a well-known financial vehicle offered by insurance companies that is used to pay a person a certain sum of money in a series of distributions or income payments made at regular intervals, typically monthly, quarterly, or annually, starting at a given date, based on a given amount of principal from an initial contribution of assets, commonly known as premium. Income annuities are available in many forms as noted above. The distributions may be made, for example, for a predetermined definite period, as in an annuity certain, or for as long as the person lives, as in a life annuity.

Unfortunately, using financial planning software to select allocations of stocks, bonds, or other investment products has its shortcomings. For example, the investor who utilizes this type of financial planning software is forced to play a guessing game, that is, the investor must select an investment option that the investor hopes will provide a desired return. Should the investor choose incorrectly, then the investment might not provide the desired amount of return for the investor. Additionally, the investor is at risk from the vagaries of the market, such as a market correction that has the potential of erasing a significant portion of the investment assets. Certain types of annuities may provide more certainty than securities, but often the reasonable return that annuities provide is exchanged for the potential for high returns associated with securities.

Therefore, there exists a need for an investment system and corresponding methods performed by the system that are not so limited.

SUMMARY OF THE INVENTION

In at least one embodiment computerized methods and corresponding systems for providing guaranteed income payments to an investor are provided that include the step or steps of: receiving information from the investor representing at least a current age of the investor, a desired income start date, a desired income payment amount, and a premium payment amount; receiving a premium payment from the investor and placing at least a portion of the premium payment into a first investment sleeve; calculating a waiting period representing the difference between the investor's current age and the desired income start date; automatically transferring using at least one computing device, during the waiting period and according to a predefined event, a portion of the premium payment from the first investment sleeve to a second investment sleeve, wherein the portion of the premium payment transferred between the first and the second sleeves is calculated by the at least one computing device as a function of a time remaining in the waiting period and the desired income amount; and presenting, to the investor, one or more income payments from assets in the second sleeve.

In one embodiment, the first investment sleeve comprises security type assets selected from a set of assets consisting of stocks, bonds, and/or investment funds, and wherein the second investment sleeve comprises non-security type assets selected from a set of assets consisting of an annuity and/or a guaranteed income investment product.

In one embodiment, the method further includes: receiving a second premium payment from the investor, with at least a portion of the second premium payment being placed into the first investment sleeve; and subsequent adjustment of the one or more income payments for presentation to the investor, the one or more income payments are adjusted taking into account the amount of the second premium payment and the time period between the time at which the premium payment was received from the investor and the start date of the one or more income payments. A second and any subsequent premium payment from the investor may also be placed in the second or other investment sleeves when received; and any subsequent adjustment of the one or more income payments may be handled in the same manner previously noted in this paragraph.

In one embodiment, the method further includes: receiving, during the waiting period, a request to withdraw a withdrawal amount from the investor; and adjusting the one or more income payments for presentation to the investor, the one or more income payments adjusted according to the withdrawn amount.

In one embodiment, transferring a portion of the premium payment from the first investment sleeve comprises calculating a transfer amount at a transfer time, the transfer amount calculated as a function of a multiplier and a present value of unfunded income at the transfer time, wherein the multiplier is determined based on an account value of the first sleeve at the transfer time and an account value of the first sleeve at a previous transfer time. In addition to the account value of the first investment sleeve being used to determine the multiplier, the account value of the second investment sleeve, or both the first and second investment sleeves may similarly be used to determine the value of the multiplier.

In one embodiment, the method further includes: transferring, during the waiting period, a portion of the premium payment from the first investment sleeve to a second investment sleeve based on market performance and/or prevailing interest rates, among other things.

In one embodiment, transferring a portion of the premium payment from the first investment sleeve to the second investment sleeve comprises calculating a change in the account value of the first investment sleeve during the waiting period; and transferring an amount proportionate to the change in the account value during the waiting period from the first investment sleeve to the second investment sleeve.

In one embodiment, transferring a portion of the premium payment from the first investment sleeve to the second investment sleeve comprises calculating a cumulative account value growth over the premium payment amount; and transferring an amount proportionate to the change in the cumulative account value growth over the premium payment amount from the first investment sleeve to the second investment sleeve.

In one embodiment, transferring a portion of the premium payment from the first investment sleeve to the second investment sleeve is made according to a constant proportion portfolio insurance ("CPPI") model, a modified CPPI model, or a variation thereof.

In one embodiment, a computerized method for providing guaranteed income payments to an investor is provided, the computerized method includes the step or steps of: receiving information from the investor representing at least a current age of the investor, a desired income start date, a desired income payment amount, and a premium payment amount; receiving a premium payment from the investor and placing the premium payment into a first investment sleeve, the premium in the first sleeve capable of being invested in security type assets; calculating a waiting period representing the difference between the investor's current age and the desired income start date; automatically transferring using at least one computing device, during the waiting period and periodically at predefined periods of time, a portion of the premium payment from the first investment sleeve to a second investment sleeve, wherein any amounts transferred into the second sleeve are capable of being invested in only non-security type assets, the portion of the premium payment transferred between the first and the second sleeves is calculated by the at least one computing device based on an account value of the first sleeve at a transfer time and an account value of the first sleeve at a previous transfer time; and presenting, to the investor, one or more income payments from assets in the second sleeve.

In one embodiment, the non-security type assets comprise fixed deferred annuities, and wherein the method further comprises purchasing, using the amount transferred to the second sleeve at each predefined period of time, a fixed deferred annuity having a waiting period of a time remaining to the income start date and a desired income payment.

BRIEF DESCRIPTION OF THE DRAWINGS

FIGS. 2 and 3 provide details for some embodiments of a method for providing income payments to an investor;

DETAILED DESCRIPTION OF THE EMBODIMENTS

In the following description, reference is made to the accompanying drawings that form a part hereof, and in which is shown by way of illustration of specific embodiments in which the invention may be practiced. It is to be understood that other embodiments may be utilized and structural changes may be made without departing from the scope of the present invention.

Figure 1:
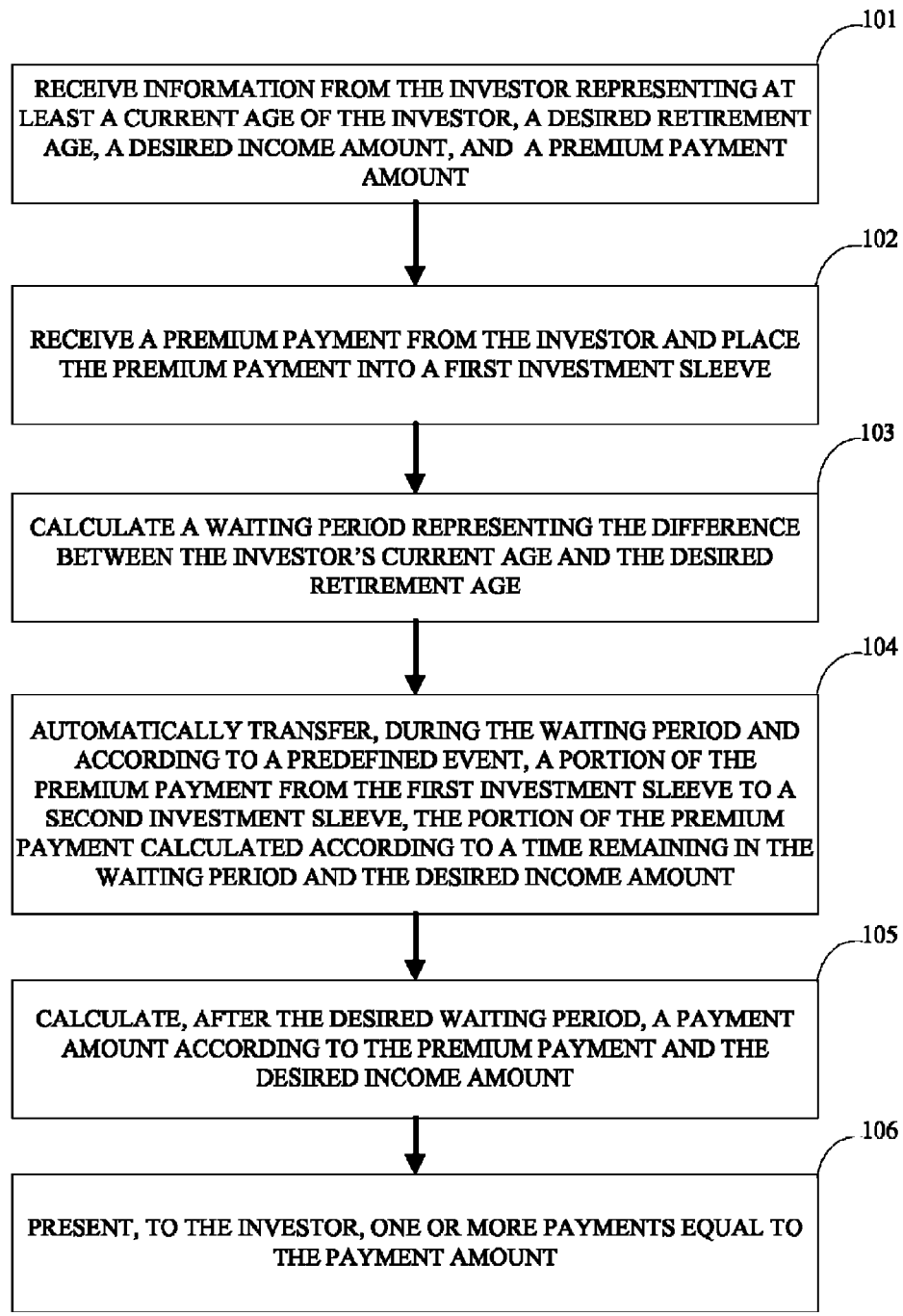
FIG. 1 illustrates a flowchart of the steps of one embodiment of a method for providing income payments to an investor.

FIG. 1 illustrates a flowchart of a method for providing income payments to an investor according to at least one embodiment of the methods disclosed herein. In step 101, information for providing a multiple-sleeve investment contract is received from the investor, such as information representing at least a current age of the investor, a desired income start date, a desired income payment amount, a premium payment amount, etc., as well as an allocation of the premium payment between investment sleeves and/or investment options therein, etc. In this embodiment a desired income start date is any age that the investor wishes to begin receiving income payments, but not necessarily limited to the age in which the investor actually retires. Payments themselves may be guaranteed and/or for the life of the insured. Regarding the allocation of the initial and any subsequent premium payment, this information may be specified initially and thereafter be applied automatically to the first and any subsequent premium payments, and/or specified or adjusted at a later time and applied automatically to any subsequent premium payments. The information received from the investor regarding the investment product may be input by the investor or an agent into an interface screen, provided by the computer system, with form elements therein for the investor or agent to input the relevant information.

The desired income payment amount may be selected by the investor based on how much money the investor wishes to receive from the premium payment when he or she achieves the income start date. FIG. 2 presents examples of a desired income payment amount as a percentage of the premium payment that the investor may select based on the age when the income payments begins 201 and a waiting period 202. For example, if the investor desires an income start date when the investor is between 61 and 65 years of age, and is willing to wait 5 years before receiving payment, then the investor can select a desired income amount between 5% and 9% of the premium payment. The chart shown in FIG. 2 may be displayed in an interface screen by the system along with the information input interface screen as a guide for the user specifying the terms of the multiple-sleeve investment product.

Returning back to the embodiment of FIG. 1, in step 102 a premium payment from the investor is received, and all or at least a portion of the premium payment is placed into a first investment sleeve, a second investment sleeve, or both. An investment sleeve is an account managed by one or more money managers, or, in the alternative, the account is managed by the investor. The first investment sleeve can include a variety of assets that are purchased with the premium payment received from the investor. Types of assets that can be purchased in the first investment sleeve include cash, stocks, bonds, mutual funds, insurance dedicated funds, exchange traded funds, exchange traded notes, Treasuries, foreign currency, options, futures, commodities contracts, or generally any type of security. It will be appreciated that other assets, including debt instruments, may be purchased with the premium payment and held in or otherwise associated with the first investment sleeve.

In step 103, a waiting period representing the difference between the investor's current age and the desired income start date is calculated. In one example the waiting period is determined by subtracting the investor's age from the investor's desired income start date. In another example a waiting period is a flat waiting period, such as 20 years, that does not rely on the investor's age. In yet another example, a waiting period is a function of the premium payment and the income amount desired by the investor for future payments. The waiting period will be an amount of time sufficient for the premium payment to yield sufficient funds for the income payment, which may vary based on the return achieved with investments in the first sleeve.

In step 104 during the waiting period and according to a predefined event, a portion of the premium payment from the first investment sleeve to a second investment sleeve is automatically transferred by the computer system, the portion of the premium payment calculated according to or as a function of a time remaining in the waiting period and the desired income amount. In some embodiments an inquiry is first sent to the investor to obtain permission, or to merely provide notice to the investor, prior to or after the transfer of the portion of the premium payment from the first investment sleeve to the second investment sleeve. In one embodiment the predefined event includes transfer of the portion of the premium payment from the first investment sleeve to the second investment sleeve on an annual basis. In another embodiment the predefined event includes transfer between the sleeves on a quarterly, or monthly basis or periodically on some other predetermined period of time.

In some embodiments the second investment sleeve includes the purchase of non-securities type investment products, such as a deferred income annuity, a fixed deferred income annuity, or any other type of annuity. Also in this embodiment, the deferred income annuity includes riders that defer income payments over a certain period of time, such as the amount of time remaining in the waiting period until the income start date. As a result, at the income start date and at the end of the calculated waiting period, the deferred income annuities, fixed deferred income annuities or other types, purchased periodically during the waiting period will begin to provide income payments to the investor. The income payments made to the investor after the income start date are provided from the sleeve containing the deferred annuity or other assets. In some embodiments payments from the deferred income annuities are provided during and/or for the lifetime of the investor. In other embodiments the payments last for a certain number of years, where the number of years is selected by the investor. One skilled in the art will appreciate that transferring assets between investment sleeves that invest in securities to one that invests in non-security type assets periodically within the waiting period reduces the investor's risk without requiring the investor to reallocate investments between asset classes as the investor gets closer to retirement.

The amount of the premium payment that is transferred by the system from the first sleeve to the second sleeve can vary. For example, the amount transferred between sleeves may be a fixed percentage every period until some or all of the premium and any return thereon is transferred to the second sleeve. The amount transferred, however, preferably varies, for example, to account for economic factors, such as market fluctuation and/or interest rate changes. In one embodiment the transfer amount, made each quarter, transfers more of the initial and any subsequent premium payments from the first investment sleeve to the second investment sleeve as a function of the balance and/or return in the first sleeve. The amount transferred may therefore increase or decrease relative to the amount transferred in previous quarters depending on whether the value of the first sleeve decreases or increases, respectively or in the reverse, during the previous quarter. An increase in the amount transferred may also occur if the value of the first sleeve increases, but the relevant interest rate decrease, and/or a decrease in the amount transferred may also occur if the value of the first sleeve decreases, but the relevant interest rate increase. In addition to transfers from the first sleeve to second sleeve, transfers from the second sleeve to the first sleeve may similarly also be possible. The number of times that transfer from the second to the first sleeves may be unlimited or limited to a fixed number of times, e.g., only once or twice.

In a more specific embodiment, the transfer between first and second investment sleeves is performed according to a calculated multiplier ("m") and a present value of the unfunded income ("PV of UI"). For example, the following formulas reflect the above-discussed embodiments by calculating the transfer amount ("TA") to be made from the first sleeve to the second sleeve at the end of each quarter:

$$TA = [m \times (PV \text{ of } UI)]/[n-t+1] \text{ where } m=1 \text{ if } g_t \geq 1; \text{ and}$$
$$m = 1/g_t^2 \text{ if } g_t < 1$$

$$g_t = AV_t/AV_{t-1} \text{ PV of } UI = [\text{Guaranteed income amount} - \text{Funded income amount}]/\text{DIA rate}$$

In the above set of formulas, the multiplier "m" serves to transfer more of the premium payment to the second investment sleeve when the account value ("AV") of the first, second, or both investment sleeves decreases between quarters or any other interval. The AV may decrease because of a market correction or if the investor elects to transfer money out of the first investment sleeve. The present value of the unfunded income ("PV of UI") is calculated by subtracting the funded income amount from the guaranteed income amount and then dividing by the deferred income annuity ("DIA") rate. The variable "n" represents the waiting period, and variable "t" is defined in terms of the transfer frequency. The embodiment reflected by the above equations considers changes in AV over the chosen time interval, such as a quarterly time interval, instead of a cumulative growth.

Another embodiment that considers cumulative AV growth over the premium paid, while still transferring more money to the second investment sleeve when AV decreases, is achieved by substituting the above equation for $g_t^2$ with:

$$g_t^2 = AV_t/(\text{Premium amount} - \text{Transfers})$$

In this embodiment more money is transferred from the first investment sleeve to the second investment sleeve when AV decreases, however, because the function depends on the premium amount less transfers, the function accounts for cumulative AV growth over the premium paid by the investor.

Yet another embodiment for transferring money from a first investment sleeve to a second investment sleeve during a waiting period follows a constant proportion portfolio insurance ("CPPI") model, a modified CPPI model, or a variation thereof. The amount of money placed into the first investment sleeve at the beginning is calculated based on a multiplier ("m") times the quantity of "assets" minus a "floor". The multiplier in this embodiment is a constant of either 3, 4, or 5, depending on the correction size that is being insured against. For example, a chosen multiplier of 5 represents insuring against a correction of 20% before the account is rebalanced. Accordingly, a multiplier of 3 represents insuring against a correction of 33% and a multiplier of 4 represents insuring against a correction of 25%. One of skill in the art will appreciate that other constants or variable may be utilized depending upon the correction size that is being insured against. The "assets" are the account value in the first investment sleeve plus the present value of the funded income in the second investment sleeve. The present value of the funded income in the second investment sleeve is calculated by dividing the funded income by, for example the DIA rate or the applicable interest rate, such as the fixed deferred annuity rate or any rate applied to the assets of the second sleeve. The "floor" is calculated as a present value of the guaranteed income, where the present value of the guaranteed income is calculated by the guaranteed income divided by the DIA rate. Then, the transfer amount from the first investment sleeve to the second investment sleeve is selected as a maximum of the account value in the first investment sleeve minus the calculated amount of money in the first investment sleeve.

In an alternate embodiment of the CPPI model discussed above, a transfer from the first investment sleeve to the second investment sleeve is executed only if the quantity of the account value in the first investment sleeve divided by the present value of the unfunded income is greater than n, which is, in one example, a constant of 1.25, 1.33, or 1.5. If that quantity is greater than n, then the TA is calculated according to the formula:

$$TA=(AV \text{ in Sleeve } 1-n*PV \text{ of Unfunded Income})/(1-n)$$

In this example the present value of the unfunded income is the unfunded income divided by the DIA rate. Notably, this example produces the similar results as the previous CPPI embodiment when n=m/(m−1), where m is the multiplier discussed in the previous CPPI embodiment.

FIG. 3 illustrates an embodiment for transferring a portion of the premium payment from the first investment sleeve to the second investment sleeve according to the above formula. FIG. 3 includes Year 301, Investment Sleeve 302, DIA Sleeve 303, Total Value 304, Market 305, and Interest Rates 306. In the embodiment shown in FIG. 3, Year 301 shows the first year as the year that the initial premium was received from the investor. Years 2 through 11 each occur during the waiting period, and are the times when money is transferred from the first investment sleeve, denoted as Investment Sleeve 302 to the second investment sleeve, denoted as DIA Sleeve 303. Total Value 304 represents the total value of the investor's assets among both Investment Sleeve 302 and DIA Sleeve 303. Market 305 represents the performance of any stock market index, for example the Dow Jones Industrial Average-$e^{SM}$, the S&P 500 Index®, the NASDAQ Composite Index®, or the performance of the assets in the first sleeve. Interest rates 306 represents the any interest rate, such as the LIBOR®. As shown in FIG. 3, in the year in which the premium was received from the investor, in the example, the initial premium payment amount is $100,000, of which $95,000 of the premium is allocated in Investment Sleeve 302, and $5,000 of the premium is allocated in DIA Sleeve 303. At the end of each Year 301 the amount of money to transfer from Investment Sleeve to DIA Sleeve is calculated according to the above formula or formulas, and the calculated amount is transferred from Investment Sleeve 302 to DIA Sleeve 303. This transfer will generally involve liquidating assets from the first investment sleeve in order to purchase one or more annuities in the second investment sleeve. The assets sold may be selected by the investor or by the system automatically in order to maintain a desired allocation between assets in the first sleeve. It is understood that the allocation between asset classes may vary as the investor gets closer to retirement. Therefore, a greater percentage of assets with greater volatility (equities) may be sold relative to assets with lower volatility (fixed income instruments) in each subsequent year from the initial premium up until the income start date.

In the Example shown in FIG. 3, by the end of the waiting period sufficient funds are transferred into the second sleeve to fund the guaranteed income payment. The return from the assets in the first sleeve over the waiting period may result in an excess over the amount necessary to fund the guaranteed income payment. This excess amount may remain in the first sleeve or generally in an investment account, or may be used to purchase additional annuities and therewith provide income payments greater than the amount of the guaranteed income payments. In the event the return from the assets in the first sleeve result in a shortfall with regard to the amount needed to fund the guaranteed income payment, all of the value of the assets in the first sleeve is transferred to the second sleeve. The difference may be funded with a fee assessed periodically, e.g., monthly, quarterly, yearly, etc., against the assets in the first, second, or both sleeves.

Returning to FIG. 1, in step 105, after the desired waiting period a payment amount according to the premium payment and the desired income payment is calculated. For example, if the investor indicated a desired guaranteed income payment of 5% of the premium payment quarterly, then the amount calculated in step 105 will be $5,000. If the investor paid additional premium directly or via a better than expected return from the assets of the first sleeve, the premium may be calculated at step 105 accordingly. In step 106 one or more payments equal to the income payment amount are presented to the investor.

Figure 4:
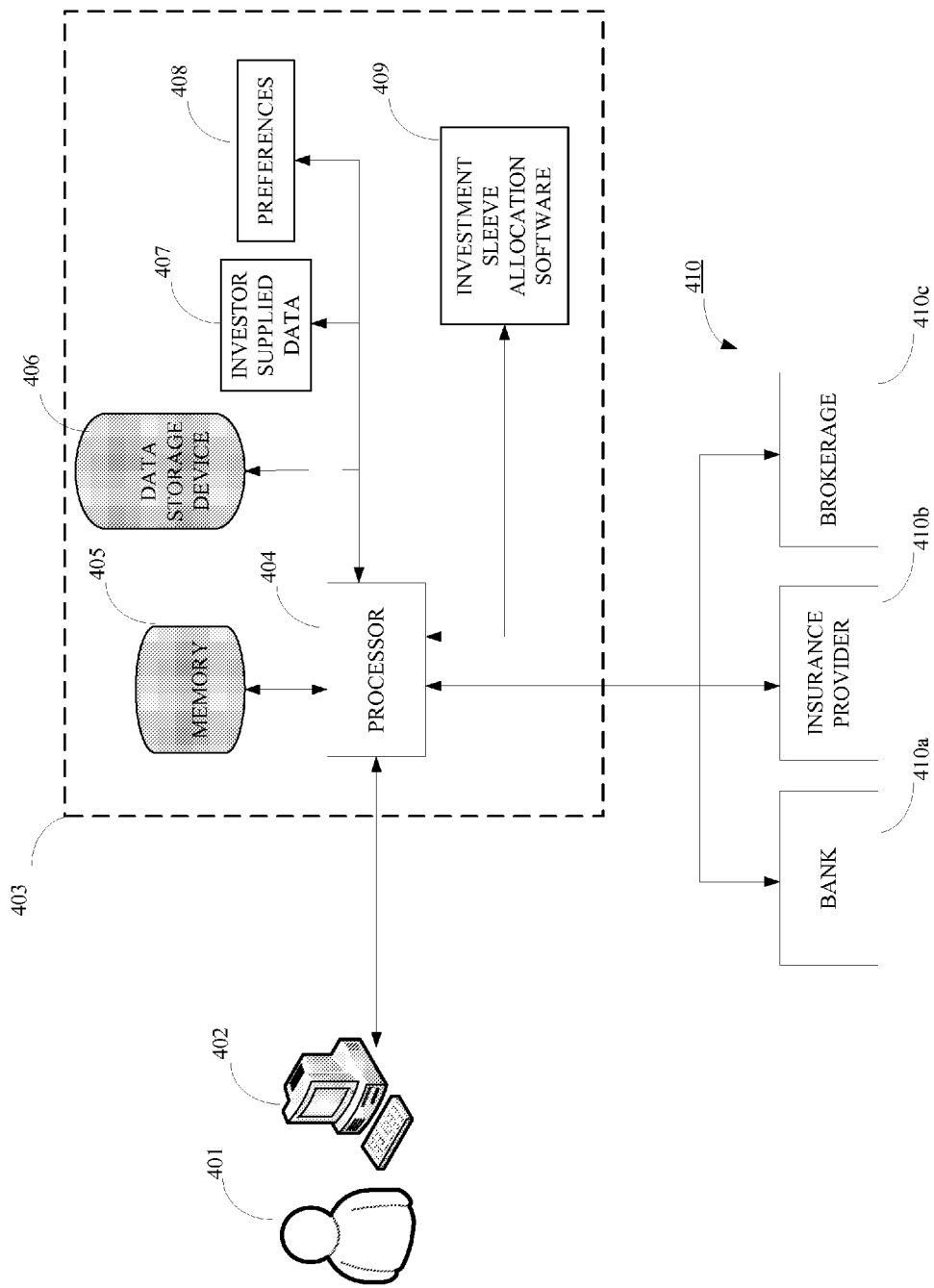
FIG. 4 presents a diagram of a system for providing income payments to an investor according to one embodiment of the invention.

FIG. 4 illustrates an exemplary overview of an architecture for a system for providing income payments to an investor. A user 401 accesses computer terminal 402 to send and receive information from system 403. The income payments provided to the investor as well as any of the other variables disclosed herein, in at least one embodiment, are calculated or otherwise provided through a computer program product including executable instructions stored on a computer readable medium. By way of example, a processor 404 performs executable operations based on instructions received from the memory device 405. Through the operations, the processor 404 administers and tracks investment allocations and income payments in a variety of ways. For example, the processor 404 may be used for managing the investment sleeves, receiving information from the investor and from external sources, performing transfers of money between the investment sleeves, and presenting a payment amount to the investor. The investor's assets may be accessed and allocated via financial institutions 409 connected to processor 404.

As illustrated in FIG. 4, the user 401 may be an investor capable of accessing system 403, via computer 402, as generated and run on processor 404. The processor 404 is operative to perform the computing operations described above. The system 403 includes the processor 404, memory device 405, data storage device 406, investor supplied data 407, preferences 408, and investment sleeve allocation software 409. It is also understood that system 403 and related components, 404-409 may be disposed directly within the computer 402, or may be distributed throughout a network, such as the Internet, a wide area network, a local network or an intranet, or a combination thereof.

Processor 404 produces an investment sleeve allocation space by executing investment sleeve allocation software 409 to facilitate the transfer of money between various investment sleeves as discussed herein. Based on investor supplied data 407, preferences 408, the processor 404 calculates an amount to transfer between the various investment sleeves.

Financial institutions 410, which may include bank 410a, insurance provider 410b, and brokerage 410c, serve to process the investment sleeve allocations calculated by the system 403. After calculating the types of investments contained in each investment sleeve and the amount of money contained in each investment sleeve, processor 404 transmits data to each of the financial institutions 410 with instructions to purchase and/or sell specified amounts of the allocated assets and products. For example, bank 410a is instructed to purchase a certain number of certificates of deposit, insurance provider 410b is instructed to purchase a certain amount of annuities for the investor, and brokerage 410c is instructed to purchase a certain amount of common stock for the investor.

Figure 5:
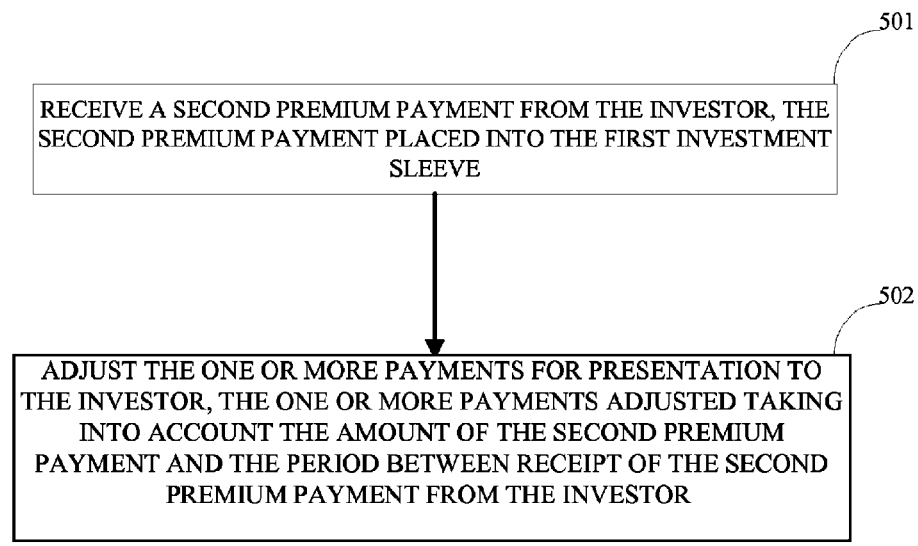
FIGS. 5 through 7 present flow charts for embodiments of a method for providing income payments to an investor.

FIG. 5 presents a flow chart for steps according to a further embodiment of a method for providing income payments to an investor. In step 501 a second premium payment from the investor is received, at least a portion of which may be placed into the first investment sleeve. Although the first, second, and any subsequent premium payments may be discussed herein as being deposited into the first investment sleeve, it is understood that a portion of the initial and any subsequent premium payment or payments may be deposited into the first investment sleeve and a portion of the premium payment may be deposited into the second or any other sleeve. Next, in step 502, the one or more payments for presentation to the investor are adjusted according to the amount of the second premium payment and a time at which the second premium payment was received from the investor. That is, the guaranteed income payment may be increased accordingly to reflect the additional premium and the remaining amount of time in the waiting period. Interest rates applied to the additional premium payments or annuities purchased therewith may be the same interest applied to the first or any previous premium payment, or the prevailing rate at the time the additional premium is paid or annuities are being purchased therewith. Moreover, any annuities purchased with the additional premium may provide their own guaranteed amount.

Figure 6:
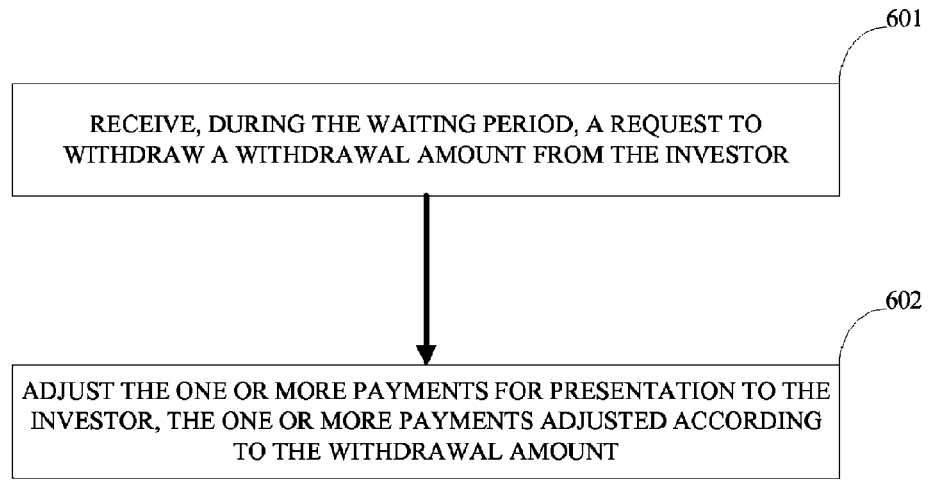

FIG. 6 presents a flow chart for steps according to a further embodiment of a method for providing income payments to an investor. In step 601 during the waiting period a request to withdraw a withdrawal amount from the investor is received. In some embodiments this withdrawal amount may also be referred to as a liquidity option, which is optionally exercised by the investor. The liquidity option allows the investor to receive all or part of his premium payment back from either the first or second investment sleeve at any time during the waiting period or thereafter. Next in step 602 the one or more income payments for presentation to the investor are adjusted to reflect the withdrawn amount. In one embodiment, the one or more payments are reduced on a pro rata basis, i.e., reduced in the same proportion as the contract value was reduced by the withdrawal amount made by the investor. In another embodiment all withdrawals are first taken from the first sleeve or the investment sleeve and will be subject to surrender charges.

Figure 7:
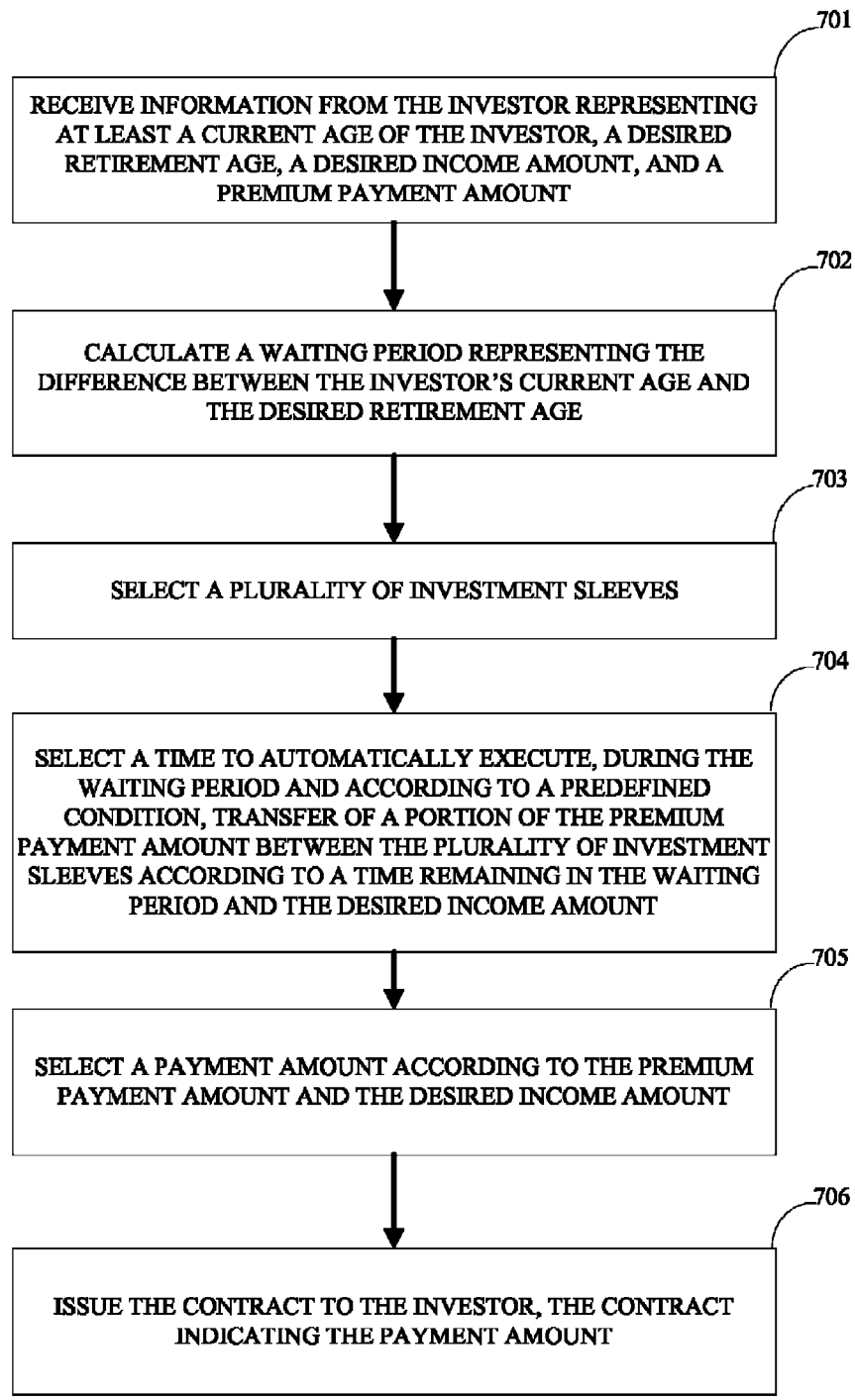

FIG. 7 presents a flow chart for a method for issuing a multiple-sleeve investment contract to an investor. In step 701 information for providing the multiple-sleeve investment contract is received from the investor, such as representing at least a current age of the investor, a desired income start date, a desired income amount, and a premium payment amount is received. Next, in step 702, a waiting period representing the difference between the investor's current age and the desired income start date is calculated. In step 703 a plurality of investment sleeves are selected. In step 704 a time to automatically execute, during the waiting period and according to a predefined condition, for transfer of a portion of the premium payment amount between the plurality of investment sleeves according to a time remaining in the waiting period and the desired income amount is selected. Next, in step 705 a payment amount according to the premium payment and the desired income amount is selected, and in step 706 the contract indicating the payment amount is issued to the investor.

FIGS. 1 through 7 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for providing guaranteed income payments to an investor, the computerized method comprising:
   receiving information from the investor representing at least a current age of the investor, a desired income start date, a desired income payment amount, and a premium payment amount;
   receiving a premium payment from the investor and placing at least a portion of the premium payment into a first investment sleeve;
   calculating a waiting period representing the difference between the investor's current age and the desired income start date;
   automatically transferring using at least one computing device, during the waiting period and according to a predefined event, a portion of the premium payment from the first investment sleeve to a second investment sleeve, wherein the portion of the premium payment transferred between the first and the second sleeves is calculated by the at least one computing device as a function of a time remaining in the waiting period and the desired income amount, wherein transferring a portion of the premium payment from the first investment sleeve comprises calculating a transfer amount at a transfer time, the transfer amount calculated as a function of a multiplier and a present value of unfunded income at the transfer time, wherein the multiplier is determined based on an account value of the first sleeve at the transfer time and an account value of the first sleeve at a previous transfer time; and
   presenting, to the investor, one or more income payments from assets in the second sleeve.

2. The computerized method of claim 1, wherein the first investment sleeve comprises security type assets selected from a set of assets consisting of a stock, a bond, and an investment fund, and wherein the second investment sleeve comprises non-security type assets selected from a set of assets consisting of an annuity and a guaranteed income investment product.

3. The computerized method of claim 1, further comprising:
   receiving a second premium payment from the investor, at least a portion of the second premium payment placed into the first investment sleeve; and
   adjusting the one or more income payments for presentation to the investor, the one or more income payments adjusted according to the amount of the second premium payment and a time between the time at which the premium payment was received from the investor and the start date of the one or more income payment.

4. The computerized method of claim 1, further comprising:
   receiving, during the waiting period, a request to withdraw a withdrawal amount from the investor; and
   adjusting the one or more income payments for presentation to the investor, the one or more income payments adjusted according to the withdrawn amount.

5. The computerized method of claim 1, further comprising transferring, during the waiting period, a portion of the premium payment from the first investment sleeve to a second investment sleeve based on at least one of market performance and interest rates.

6. The computerized method of claim 1, wherein transferring a portion of the premium payment from the first investment sleeve to the second investment sleeve comprises calculating a change in the account value during the waiting period; and transferring an amount proportionate to the change in an account value of the first sleeve during the waiting period from the first investment sleeve to the second investment sleeve.

7. The computerized method of claim 1, wherein transferring a portion of the premium payment from the first investment sleeve to the second investment sleeve comprises calculating a cumulative account value growth over the premium payment amount; and transferring an amount proportionate to the change in the cumulative account value growth over the premium payment amount from the first investment sleeve to the second investment sleeve.

8. The computerized method of claim 1, wherein transferring a portion of the premium payment from the first investment sleeve to the second investment sleeve is made according to a Constant Proportion Portfolio Insurance (CPPI) model or a variation thereof.

9. A computer system comprising at least one computing device coupled over a network to at least one client device, the at least one computing device having a memory associated therewith that stores software that when executed causes the at least one computing device to perform steps comprising:
   receiving information from an investor representing at least a current age of the investor, a desired income start date, a desired income payment amount, and a premium payment amount;
   receiving a premium payment from the investor and placing the premium payment into a first investment sleeve;
   calculating a waiting period representing the difference between the investor's current age and the desired income start date;
   automatically transferring, during the waiting period and according to a predefined event, a portion of the premium payment from the first investment sleeve to a second investment sleeve, wherein the portion of the premium payment transferred between the first and the second sleeves is calculated as a function of a time remaining in the waiting period and the desired income amount, wherein transferring a portion of the premium payment from the first investment sleeve comprises calculating a transfer amount at a transfer time, the transfer amount calculated as a function of a multiplier and a present value of unfunded income at the transfer time, wherein the multiplier is determined based on an account value of the first sleeve at the transfer time and an account value of the first sleeve at a previous transfer time; and presenting, to the investor, one or more income payments from assets in the second sleeve.

10. The system of claim 9, wherein the first investment sleeve comprises security type assets selected from a set of assets consisting of a stock, a bond, and an investment fund, and wherein the second investment sleeve comprises non-security type assets selected from a set of assets consisting of an annuity and a guaranteed income investment product.

11. The system of claim 9, the steps further comprising:
receiving a second premium payment from the investor, the second premium payment placed into the first investment sleeve; and
adjusting the one or more income payments for presentation to the investor, the one or more income payments adjusted according to the amount of the second premium payment and a time between the time at which the premium payment was received from the investor and the start date of the one or more income payment.

12. The system of claim 9, the steps further comprising:
receiving, during the waiting period, a request to withdraw a withdrawal amount from the investor; and
adjusting the one or more income payments for presentation to the investor, the one or more income payments adjusted according to the withdrawn amount.

13. The system of claim 9, the steps further comprising transferring, during the waiting period, a portion of the premium payment from the first investment sleeve to a second investment sleeve based on at least one of market performance and interest rates.

14. The system of claim 9, wherein transferring a portion of the premium payment from the first investment sleeve to the second investment sleeve comprises calculating a change in the account value during the waiting period; and transferring an amount proportionate to the change in the account value during the waiting period from the first investment sleeve to the second investment sleeve.

15. The system of claim 9, wherein transferring a portion of the premium payment from the first investment sleeve to the second investment sleeve comprises calculating a cumulative account value growth over the premium payment amount; and transferring an amount proportionate to the change in the cumulative account value growth over the premium payment amount from the first investment sleeve to the second investment sleeve.

16. The system of claim 9, wherein transferring a portion of the premium payment from the first investment sleeve to the second investment sleeve is made according to a Constant Proportion Portfolio Insurance (CPPI) model.

17. A computerized method for providing guaranteed income payments to an investor, the computerized method comprising:
receiving information from the investor representing at least a current age of the investor, a desired income start date, a desired income payment amount, and a premium payment amount;
receiving a premium payment from the investor and placing the premium payment into a first investment sleeve, the premium in the first sleeve being invested in security type assets;
calculating a waiting period representing the difference between the investor's current age and the desired income start date;
automatically transferring using at least one computing device, during the waiting period and periodically at predefined periods of time, a portion of the premium payment from the first investment sleeve to a second investment sleeve, wherein the portion of the premium payment transferred between the first and the second sleeves is calculated by the at least one computing device as a function of a time remaining in the waiting period and the desired income amount, any amounts transferred into the second sleeve are invested in only non-security type assets, and wherein transferring a portion of the premium payment from the first investment sleeve comprises calculating a transfer amount at a transfer time, the transfer amount calculated as a function of a multiplier and a present value of unfunded income at the transfer time, wherein the multiplier is determined based on an account value of the first sleeve at the transfer time and an account value of the first sleeve at a previous transfer time; and
presenting, to the investor, one or more income payments from assets in the second sleeve.

18. The method of claim 17, wherein the non-security type assets comprise fixed deferred annuities, and wherein the method further comprises purchasing using the amount transferred to the second sleeve at each predefined period of time a fixed deferred annuity having a waiting period of a time remaining to the income start date and a desired income payment.

* * * * *